J. A. BENNETT.
WIND WHEEL.
APPLICATION FILED MAR. 7, 1911.
1,015,416.
Patented Jan. 23, 1912.
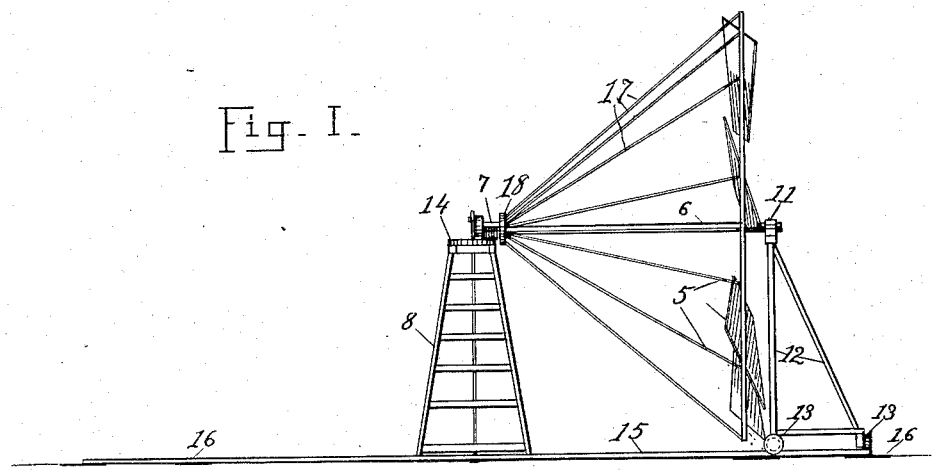
Fig. I.
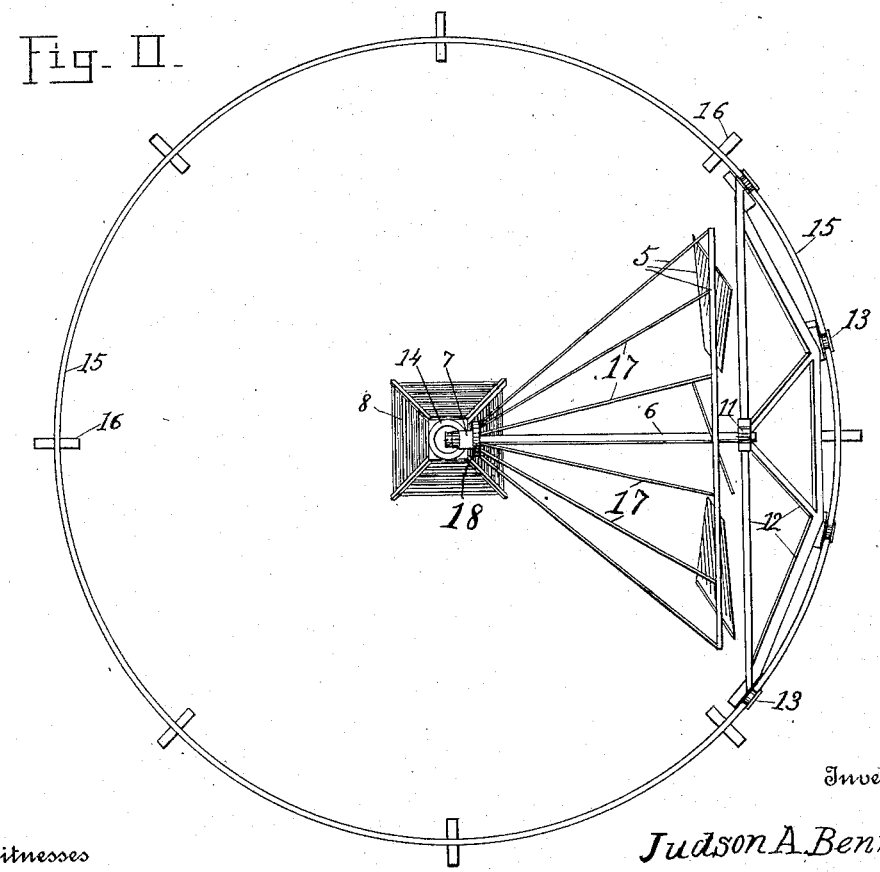
Fig. II.
Witnesses
N. S. Waller.
D. E. Waller.
Inventor
Judson A. Bennett.
By W. X. Stevens.
Attorney

UNITED STATES PATENT OFFICE.

JUDSON A. BENNETT, OF CLOVIS, NEW MEXICO.

WIND-WHEEL.

1,015,416.  Specification of Letters Patent.  Patented Jan. 23, 1912.

Application filed March 7, 1911. Serial No. 612,962.

*To all whom it may concern:*

Be it known that I, JUDSON A. BENNETT, a citizen of the United States, residing at Clovis, in the county of Curry and State of New Mexico, have invented certain new and useful Improvements in Wind-Wheels, of which the following is a specification.

This invention relates to wind wheels of that class which are designed to face the wind in a plane substantially at right angles to the line of the wind, and called, vertical wind wheels. Its object is to provide means for supporting unusually large wheels extending nearly to the ground, to utilize very light winds, especially in sections of the country where there are few or no obstructions, such as hills and trees.

To this end my invention consists in the construction and combination of parts forming a wind wheel, hereinafter more fully described, and particularly set forth in the claims, reference being had to the accompanying drawings in which, Figure 1 shows in side elevation, a wind wheel according to my invention. Fig. 2, shows a plan view of the same.

Numeral 5 represents a wind wheel mounted on a shaft 6, which is journaled at both ends in bearings. The bearing 7, carrying the inner or transmitting end, is journaled to rotate horizontally upon a central trunnion 14 which is fixed upon some stationary support, such as the derrick 8, so that the wind wheel may swing around this central support, to face the wind blowing from any point of the compass. The bearing 11, for the outer end of the shaft, is mounted on a truck comprising the supporting frame 12, and wheels 13. These wheels travel upon a circular track 15, which is located concentrically with the trunnion 14, upon suitable supports 16, that are fixed in the ground. The central support may be any suitable device, such as a mast, or tower, or the derrick 8, as shown. Stay braces 17, connect the periphery of the wheel 5, with the main shaft 6, near the central bearing 7, by means of a collar 18, that is fixed on the shaft, the collar and braces being parts of the wheel and revolving therewith. This wheel is preferably mounted so as to point the central end of its shaft toward the wind, as that is the position it would normally assume if left free to be swung by the wind.

The words "horizontal shaft" are used in the general sense, as indicating a shaft truly horizontal, or one a little inclined to bring the wheel at right angles with the general trend of the wind. The outer end support of the shaft and the bracing supports to the outer ends of the vanes enable this wheel to resist greater force of the wind than can safely be resisted by a wheel supported only at one side; and a much larger wheel may, by this means, be arranged to utilize the winds on the plains. It may be used for oil well drilling and pumping; for irrigation pumping, and for all purposes requiring local power.

What I believe to be new and desire to secure by Letters Patent is briefly stated in the following claims—

1. A wind wheel mounted on a shaft having a bearing at each end, one of the bearings being journaled on a fixture for horizontal rotation, and the other bearing mounted on a truck provided with wheels; a circular track for the truck wheels to travel upon, and stay braces connecting the periphery of the wind wheel with its own shaft near the center of horizontal rotation.

2. In a wind wheel, a horizontal shaft having a bearing at each end, one of the bearings being journaled on a fixture for horizontal rotation; a truck carrying the other bearing and mounted on wheels; a circular track for the truck wheels to travel upon; a wind wheel mounted upon the aforesaid shaft between its bearings; and stay braces connecting the periphery of this wind wheel with its own shaft near the center of horizontal revolution.

In testimony whereof I affix my signature in presence of two witnesses.

JUDSON A. BENNETT.

Witnesses:
GERTRUDE C. JONES,
W. B. OLDHAM.

Copies of this patent may be obtained for five cents each, by addressing the "Commissioner of Patents, Washington, D. C."